June 6, 1933.  P. H. ROUNTREE ET AL  1,913,291
RADIATOR HOSE CUTTER
Filed May 31, 1932
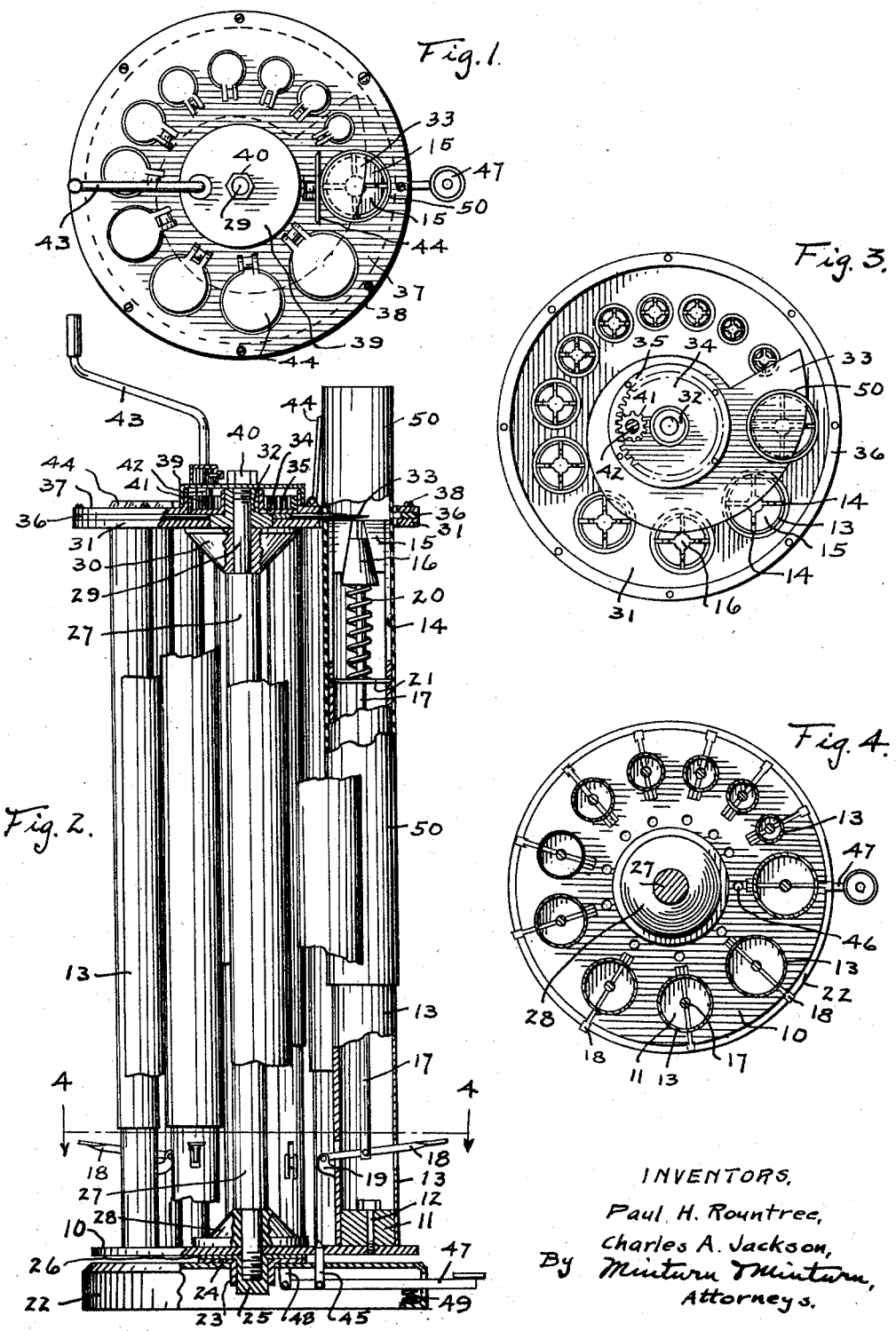
INVENTORS.
Paul H. Rountree,
Charles A. Jackson,
By Minturn & Minturn,
Attorneys.

Patented June 6, 1933

1,913,291

UNITED STATES PATENT OFFICE

PAUL H. ROUNTREE AND CHARLES A. JACKSON, OF HARRISBURG, ILLINOIS

RADIATOR HOSE CUTTER

Application filed May 31, 1932. Serial No. 614,390.

This invention relates to means for cutting off lengths of material such as radiator hose and the like. An object of the invention is to provide means which will receive a large number of lengths of hose having various diameters whereby substantially the entire range of sizes of hose now employed by the various automobiles and tractors may be immediately available and be displayed all within a compact space. A further important object of the invention is to have the stored hose immediately available to be cut off to desired lengths without having to remove the initial length of hose from its place of storage or have to go to shelves or bins to locate the particular size of hose and then carry it to a cutting off device.

A still further important advantage of the invention is that the hose may be accurately cut on a plane normal to the axis of the hose. Another advantage of the invention is that the hose may be readily cut to exact lengths and not be distorted while being cut.

Other objects and advantages of the invention such as arise from the new combinations of elements brought together, will become apparent to those versed in the art by the following description in which Fig. 1 is a top plan view of a structure embodying our invention;

Fig. 2, a fragmentary side elevation of the structure;

Fig. 3, a top plan view of the structure with the top cover removed, and

Fig. 4, a horizontal transverse section on the line 4—4 in Fig. 2.

Like characters of reference indicate like parts throughout the several views in the drawing.

We form a circular plate 10 on the top side of which we fix a plurality of cylindrical blocks 11 therearound in spaced relation and of decreasing diameter. Eleven of such blocks are here shown and are each fixed to the plate in any convenient manner here shown as the cap screw 12, Fig. 2. These blocks 11 are of decreasing diameter and receive thereover tubes 13 to be supported in vertical positions thereby. These tubes are preferably made of metal to have thin walls and are all of equal length to have their upper ends terminate in a common horizontal plane. The tubes may be welded so as to integrally unite them with the plate 10 whereby they are rigidly maintained in their vertically disposed positions. The upper end of each of these tubes 13 is provided with a number of longitudinal slots 14, here shown as four in number, extending from the upper end downwardly for a substantial distance so that the portions of the tube between these slots may be yieldingly sprung outwardly. On the inner side of each of these portions of the tube between adjacent slots is fixed a segment 15 having an inner conical surface sloping inwardly from bottom to top toward the axis of the tube. These segments, being four in number for each tube are separated one from the other by spaces therebetween corresponding to the slots in the tube.

A cone 16 is formed to be entered between the segments or blocks 15 in each tube as a means for spreading the blocks outwardly one from the other and thus expanding the end of the tube. A rod 17 is carried in each tube to extend vertically therethrough and have its upper end attached to the cone 16. The lower end of the rod 17 is pivotally attached to a foot lever 18 which passes transversely through the tube to be pivotally secured by its inner end by bracket 19 secured on the back side of the tube, the tube being slotted to permit the lever 18 to be rocked vertically about the bracket 19 so as to raise and lower the rod 17. A compression spring 20 surrounds the rod immediately below the cone 16 and has its lower end bearing against a stop 21 which is secured transversely across and within the tube below the lower ends of the slots 14, the spring 20 being initially compressed to force the cone 16 between the blocks 15 so as to hold the upper end of the tube in an expanded position. The portions of the tube between the slots 14 being made of metal, preferably steel, are spring-like in nature and upon the withdrawal of the cone 16 from between the blocks 15, these portions of the tube tend to return to their normal unexpanded positions.

A base 22 is provided to have a central hole therein through which is inserted a hollow boss 23 of a bearing plate 24 which rests upon the top side of the base 22. Within the bore of the boss 23 is inserted a stub shaft 25 to be rotatably guided therein. This shaft 25 extends downwardly from the thrust plate 26 which bears against the under side of the plate 10. A central shaft 27 is provided to pass through a bearing collar 28 by a lower end of reduced diameter, and by this end down through the plate 10 to screw-threadedly engage through the plate 26 whereby the plate 10 is gripped between the collar 28 and the plate 26.

The upper end of the shaft 27 is likewise provided with an end 29 of a diameter reduced from that of the shaft itself and a bearing collar 30 is slipped over this end 29. The upper face of the collar 30 is horizontally disposed and is of considerable area, and the plane thereof is sufficiently below that of the top ends of the tubes 13 to have a circular plate 31 rested on the collar 30 to have its top face be in the same plane or slightly above that of the top ends of the tubes 13. This plate 31 is provided with holes therethrough, one hole for each tube 13, and each hole is of slightly greater diameter than that of the corresponding tube which extends to within that hole, the top ends of the tubes being in the plane of the top face of the plate 31 or slightly below, but in any event extending above the under side of the plate. The plate 31 is centrally disposed about the shaft end 29 by the lower end of a thrust bearing 32 which extends through the plate 31 and rests against the collar 30. We form a cutting knife 33 to have an outer cutting edge approximately involute in shape and mount this knife against the under side of a plate 34 which is revolubly carried around the bearing 32. The knife 33 is of such dimensions that the point of its cutting edge furthest removed from its center of rotation which is the axis of the shaft 27 will be beyond the outer edge of that hole provided for the tube 13 having the greatest diameter and the point on the cutting edge being nearest the center of rotation will pass well within the inner sides of all of the holes through the plate 31 provided for the tubes 13. On the upper side of the plate 34 is fixed concentrically about the axis of the shaft 27 an internal ring gear 35. The knife 33, plate 34 and ring gear 35 are so fixed together as to turn as a unit when the ring gear 35 is operated. Entirely around the plate 31 toward its outer edge and on the top face thereof is placed a spacing ring 36 which is of a thickness but slightly greater than that of the knife 33 and a cover plate 37 is placed over the knife to rest on the ring 36 and screws 38 are passed down through the cover plate 37, the ring 36 and into the plate 31. This cover plate 37 is provided with holes therethrough symmetrically placed corresponding to those in the plate 31 and of the same corresponding diameters.

This plate 37 has an upturned annular flange surrounding the periphery of the ring gear 35 and a cap 39 is placed down over this upturned flange to have the shaft end 29 extend concentrically therethrough by a threaded end and a nut 40 is placed on the shaft end and run down against the cap 39. The height of the bearing 32 is such that when the nut 40 is run down on the shaft 29 the cap will be forced thereagainst as well as against the top side of the plate 37 whereby the entire top structure including the plate 31, ring 36, plate 37, and bearing 32, is compressively held against the collar 30.

A spur gear 41 is carried on a vertically disposed shaft 42 to be maintained in mesh with the gear 35 and the upper end of this shaft 42 extends vertically through the cover 39 to be engaged by a turning crank 43 preferably through some ratchet mechanism of any type well known to those versed in the art whereby the gear 41 may be revolved in a continuous direction by oscillation of the crank 43. Over each of the holes through the plate 37, is a cover plate 44 which is hinged to the plate 37 to permit its being lifted from over the hole.

In using the above described structure, the covers 44 are raised and the levers 18 pushed downwardly so that lengths of hose 50 may be entered through the holes in the plate 37 to be pushed down around the tubes, the upper ends of which are present thereunder. The tubes are made of the proper diameter whereby the varying sizes of hose may be slipped over the tubes with a rather close fit but without having to force the hose thereover. It is preferable that the tube diameter be such that the hose on that particular tube will remain in any position along the tube length to which the hose may be carried. The various lengths of hose having the different diameters corresponding to the various tubes 13 are pulled down along the tubes to have the upper ends of the hose carried to below the plane of the under side of the knife 33. Although the hose may be slightly larger than the particular tube on which it is carried, the hose will be retained toward the upper end of the tube by releasing the lever 18 so as to permit the spring 20 to expand the upper end of the tube and thus grip the hose to retain it. After the various tubes have received the lengths of hose therein, the cover plates 44 will be dropped to cover the holes in the plate 37 through which no hose is protruding as safety means to prevent the accidental insertion of the operator's fingers therein.

The particular diameter of hose wanted may be easily selected by rotating the plate 10 to bring the size around toward the operator. Preferably the operation of cutting off a length from that size is done with that particular piece of hose immediately adjacent the operator. This position is maintained by a pin 45 which has its upper end slidably passed through the top side of the base 22 to enter within a hole 46 provided in the plate 10. The lower end of the pin 45 is rockably attached to the foot lever 47 which extends by one end to without the base 22 and by the other end back to a supporting bracket 48. The lever 47 is here shown as being normally rocked upwardly to lift the pin 45 by means of a spring 49. The plate 10 is provided with a number of holes 46, one corresponding to each of the tubes 13 whereby the plate 10 may be turned to bring any one of the desired tubes to one side of the base 22 and the plate then held in that position against further rotation.

Referring to Fig. 2, assuming that a length of hose of the largest diameter is to be cut off, the lever 18 in the tube 13 carrying that particular size is depressed and the hose is gripped by the hand of the operator and shifted upwardly along the tube 13 to have the upper end of the hose pass upwardly beyond the cover plate 37, lifting the cover 44 to have the hose extend above the end of the tube 13 the desired distance corresponding to the length of cut off hose desired. In extending the hose through the plate 37, the knife 33 will of course have to be turned to be out of the way by the crank 43. When the hose is extended to the desired length, the lever 18 is released to allow the spring 20 to return the cone 16 to spread out the upper end of the tube and thereby hold the hose in the fixed position. Now by operating the crank 43, the pinion gear 41 is turned to revolve the ring gear 35 to revolve the knife 33 in a clockwise direction, Fig. 3, whereby the cutting edge of the knife is brought up against the hose which appears between the plates 31 and 37 and the knife is carried on through the hose with a sliding action to shear off the hose immediately above the end of the tube 13, the hose being held in a slightly expanded condition over the end of the tube as the knife cuts it off. The diameter of the holes through the plates 31 and 37 are such that the hose may just freely pass therethrough. The cut length of the hose may then be removed and the remaining portion of the hose will remain in the fixed position on the tube 13 until again shifted upon depression of the lever 18. Similarly hose of any other diameter may be cut.

While we have herein shown and described our invention in the form as now best known to us, it is obvious that structural changes may be made without departing from the spirit of the invention and we therefore do not desire to be limited to that precise form beyond the limitations as may be imposed by the following claims.

We claim:

1. In a storage and cut-off structure, a plate, a plurality of tubes vertically carried by the plate, a second plate across the upper ends of the tubes and having holes therethrough with one hole for each tube, each of said holes being slightly larger in diameter than that of the tube thereunder, a knife having a non-circular cutting edge rotatably mounted over said second plate adapted to have its cutting edge carried across said holes, and means for revolving the knife.

2. In a storage and cut-off structure, a plate, a plurality of tubes vertically carried by the plate, a second plate across the upper ends of the tubes and having holes therethrough with one hole for each tube, each of said holes being slightly larger in diameter than that of the tube thereunder, a knife having a non-circular cutting edge rotatably mounted over said second plate adapted to have its cutting edge carried across said holes, and means for revolving the knife, a shaft uniting said plates, a base revolubly supporting the first plate, and means selectively retaining the plate in various positions against rotation.

3. In a storage and cut-off structure, a plate, a plurality of tubes vertically carried by the plate, a second plate across the upper ends of the tubes and having holes therethrough with one hole for each tube, each of said holes being slightly larger in diameter than that of the tube thereunder, a knife having a non-circular cutting edge rotatably mounted over said second plate adapted to have its cutting edge carried across said holes, and means for revolving the knife, and means for expanding the upper ends of each of said tubes.

4. In a storage and cut-off structure, a plate, a plurality of tubes vertically carried by the plate, a second plate across the upper ends of the tubes and having holes therethrough with one hole for each tube, each of said holes being slightly larger in diameter than that of the tube thereunder, a knife having a non-circular cutting edge rotatably mounted over said second plate adapted to have its cutting edge carried across said holes, and means for revolving the knife, and means for expanding the upper ends of each of said tubes, each of said tubes entering its respective plate hole thereabove and terminating before passing above the top side of the plate.

5. In a storage and cut-off structure, a plate, a plurality of tubes vertically carried by the plate, a second plate across the upper ends of the tubes and having holes therethrough with one hole for each tube, each of said holes being slightly larger in diameter than that of the tube thereunder, a knife having a non-circular cutting edge rotatably mounted over said second plate adapted to have its cutting edge carried across said holes, and means for revolving the knife, and means for expanding the upper ends of each of said tubes, said means comprising blocks on tube portions separated by slots, and a wedge member entering between the blocks.

6. In a storage and cut-off structure, a plate, a plurality of tubes vertically carried by the plate, a second plate across the upper ends of the tubes and having holes therethrough with one hole for each tube, each of said holes being slightly larger in diameter than that of the tube thereunder, a knife having a non-circular cutting edge rotatably mounted over said second plate adapted to have its cutting edge carried across said holes, and means for revolving the knife, and means for expanding the upper ends of each of said tubes, said means comprising blocks on tube portions separated by slots, and a wedge member entering between the blocks, a spring normally urging the wedge member between the blocks to expand the tube end, and means for withdrawing the wedge member to permit the tube portions to return to their non-expanded positions.

7. In a storage and cut-off structure, a plate, a plurality of tubes vertically carried by the plate, a second plate across the upper ends of the tubes and having holes therethrough with one hole for each tube, each of said holes being slightly larger in diameter than that of the tube thereunder, a knife having a non-circular cutting edge rotatably mounted over said second plate adapted to have its cutting edge carried across said holes, and means for revolving the knife, a shaft uniting said plates, a base revolubly supporting the first plate, and means selectively retaining the plate in various positions against rotation, the upper end of each tube being expandible, means for expanding each tube individually of the other tubes irrespective of the degree of said rotation.

8. In a hose storage and cut-off device, a vertically disposed tube having an external diameter to receive a length of hose slidably thereover, means for expanding one end of the tube to press it outwardly against and hold said hose, a non-circular knife and means to rotate the knife and cause it to travel across said tube end while said hose is held thereby.

9. In a hose storage and cut-off device, a vertically disposed tube having an external diameter to receive a length of hose slidably thereover, means for expanding one end of the tube to press it outwardly against and hold said hose, a non-circular knife and means to rotate the knife and cause it to travel across said tube end while said hose is held thereby, said tube expanding means comprising a plurality of longitudinally separated tube wall portions, and a wedge member adapted to spread apart said portions.

10. In a hose storage and cut-off device, a vertically disposed tube having an external diameter to receive a length of hose slidably thereover, means for expanding one end of the tube to press it outwardly against and hold said hose, and a knife adapted to travel across said tube end while said hose is held thereby, said means comprising a plurality of longitudinally separated tube wall portions, and a wedge member adapted to spread apart said portions, a spring normally urging the member to spread the portions, and means for retracting the member to overcome the pressure of the spring.

In testimony whereof we affix our signatures.

PAUL H. ROUNTREE.
CHARLES A. JACKSON.